US010701076B2

(12) United States Patent
Gurney, III

(10) Patent No.: US 10,701,076 B2
(45) Date of Patent: Jun. 30, 2020

(54) NETWORK MANAGEMENT DEVICE AT NETWORK EDGE FOR INS INTRUSION DETECTION BASED ON ADJUSTABLE BLACKLISTED SOURCES

(71) Applicant: Arbor Networks, Inc., Burlington, MA (US)

(72) Inventor: Edmund J. Gurney, III, Canton, MI (US)

(73) Assignee: Arbor Networks, Inc., Westford, MA (US)

( * ) Notice: Subject to any disclaimer, the term of this patent is extended or adjusted under 35 U.S.C. 154(b) by 192 days.

(21) Appl. No.: 14/996,028

(22) Filed: Jan. 14, 2016

(65) Prior Publication Data
US 2017/0208083 A1  Jul. 20, 2017

(51) Int. Cl.
*H04L 29/06* (2006.01)
*H04L 12/935* (2013.01)
*H04L 12/24* (2006.01)
*H04L 12/26* (2006.01)

(52) U.S. Cl.
CPC .......... *H04L 63/101* (2013.01); *H04L 43/026* (2013.01); *H04L 63/0236* (2013.01)

(58) Field of Classification Search
CPC . H04L 63/1433; H04L 49/30; H04L 63/1458; H04L 41/046; H04L 63/101; H04L 29/06; H04L 12/935; H04L 12/24
USPC ......................................................... 726/25
See application file for complete search history.

(56) References Cited

U.S. PATENT DOCUMENTS

| | | | |
|---|---|---|---|
| 8,918,838 B1 * | 12/2014 | Baldonado | H04L 63/20 726/1 |
| 2004/0062238 A1* | 4/2004 | Yoshizawa | H04L 47/15 370/360 |
| 2005/0249206 A1* | 11/2005 | Wybenga | H04L 45/7453 370/389 |
| 2011/0183546 A1 | 7/2011 | Diab et al. | |
| 2015/0106420 A1* | 4/2015 | Warfield | H04L 41/5041 709/201 |

OTHER PUBLICATIONS

Ixia, Threat ArmorTM, Document No. 915-3143-01 Rev A, www.ixiacom.com, Oct. 2015 pp. 1-3.

* cited by examiner

*Primary Examiner* — Ashokkumar B Patel
*Assistant Examiner* — Quazi Farooqui
(74) *Attorney, Agent, or Firm* — Locke Lord LLP; Scott D. Wofsy; Christopher J. Capelli

(57) ABSTRACT

A network agent includes an ingress port in data communication with a network traffic source for receiving network traffic entering a network and an egress port in data communication with the ingress port and a protection device included in the network. The egress port is configured to transmit network traffic received from the ingress port to a network device included in the network. A processing device receives from a protection device included in the network blacklist addresses determined by the protection device to be a threat to the network, and maintains a blacklist that includes the received blacklist addresses. A physical layer device compares the network layer source address of a packet of the network traffic received by the ingress port to the blacklist and forwards the packet to the egress port only if the packet's source address is not included in the blacklist.

10 Claims, 7 Drawing Sheets

US 10,701,076 B2

NETWORK MANAGEMENT DEVICE AT NETWORK EDGE FOR INS INTRUSION DETECTION BASED ON ADJUSTABLE BLACKLISTED SOURCES

FIELD OF THE INVENTION

The disclosed embodiments generally relates to computer network protection, and more particularly, to dropping unwanted network traffic at an edge of the network.

BACKGROUND OF THE INVENTION

Networks are constantly exposed to security exploits that are of significant concern to network providers. For example, Denial of Service ("DoS") attacks can cause significant damage to networks and networked devices. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks).

Other network security threats include Trojan horse attacks that may be embedded in harmless software, viruses that can reproduce themselves and attach to executable files, worms that can spread via stored collections of e-mail addresses, and logic bombs that can remain dormant until triggered by an event (e.g., a date, user action, random trigger, etc.).

Early identification of incoming messages (e.g., packets) that pose a threat to a network can prevent or mitigate damage, since a network device can be impaired by processing or analyzing a threatening packet. One approach is to use a blacklist to block packets from a finite number of addresses. Such a blacklist can be implemented in either software or hardware. However, adding software-based blacklist functionality to an existing network device can have limitations, such as requiring device upgrades or software updates that could cause compatibility issues with the existing network configuration or other network devices, or which may require extensive testing to ensure the changes do not have any undesired effects. Furthermore, blacklists tend to block packets without providing meaningful statistics about blocked traffic and throughput. Devices that perform software processing for detection of threats are usually spaced from the network edge so that upstream devices are exposed before threat detection is performed. Additionally, the software to detect threats can result in reduced throughput and/or bandwidth that can worsen as the number of threatening packets increase.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a network agent that includes at least one hardware ingress port, at least one hardware egress port, a processing device, and a physical layer device. The at least one hardware ingress port is in data communication with a source of network traffic for receiving network traffic entering a network. The at least one hardware egress port is in data communication with the at least one ingress port and a network device included in the network. The processing device is configured to receive from a protection device included in the network at least one blacklist address determined by the protection device to be a threat to the network and maintain a blacklist that includes the received at least one blacklist address. The physical layer device is configured to compare the network layer source address of a packet of the network traffic received by the at least one ingress port to the blacklist and forward the packet to the at least one egress port only if the packet's source address is not included in the blacklist.

In further, optional aspects, a method is described that includes receiving, by at least one hardware ingress port, network traffic entering a network; receiving from the a protection device included in the network at least one blacklist address determined by the protection device to be a threat to the network; and maintaining a blacklist that includes the received at least one blacklist address. The method further includes comparing on a network layer the source address of a packet of the network traffic received by the at least one ingress port to the blacklist, forwarding the packet to a network device of the network only if the packet's source address is not included in the blacklist.

In further, optional aspects, a method of protecting a network system from threatening network traffic is described. The method includes receiving network traffic from at least one egress port of a network traffic agent, decoding the network traffic received from the at least one egress port using a layer higher than the physical layer, analyzing the received network traffic for detecting a threat to the network; and extracting a source address from a packet of the network traffic that was determined to pose a threat to the network. The method further includes transmitting the source address extracted to the network traffic agent for blacklisting the source address, and sending the received network traffic to its intended destination as indicated by decoded content of the network traffic.

BRIEF DESCRIPTION OF THE DRAWINGS

The accompanying appendices a drawings illustrate various non-limiting, example, inventive aspects in accordance with the present disclosure.

DETAILED DESCRIPTION OF CERTAIN EMBODIMENTS

Figure 1:
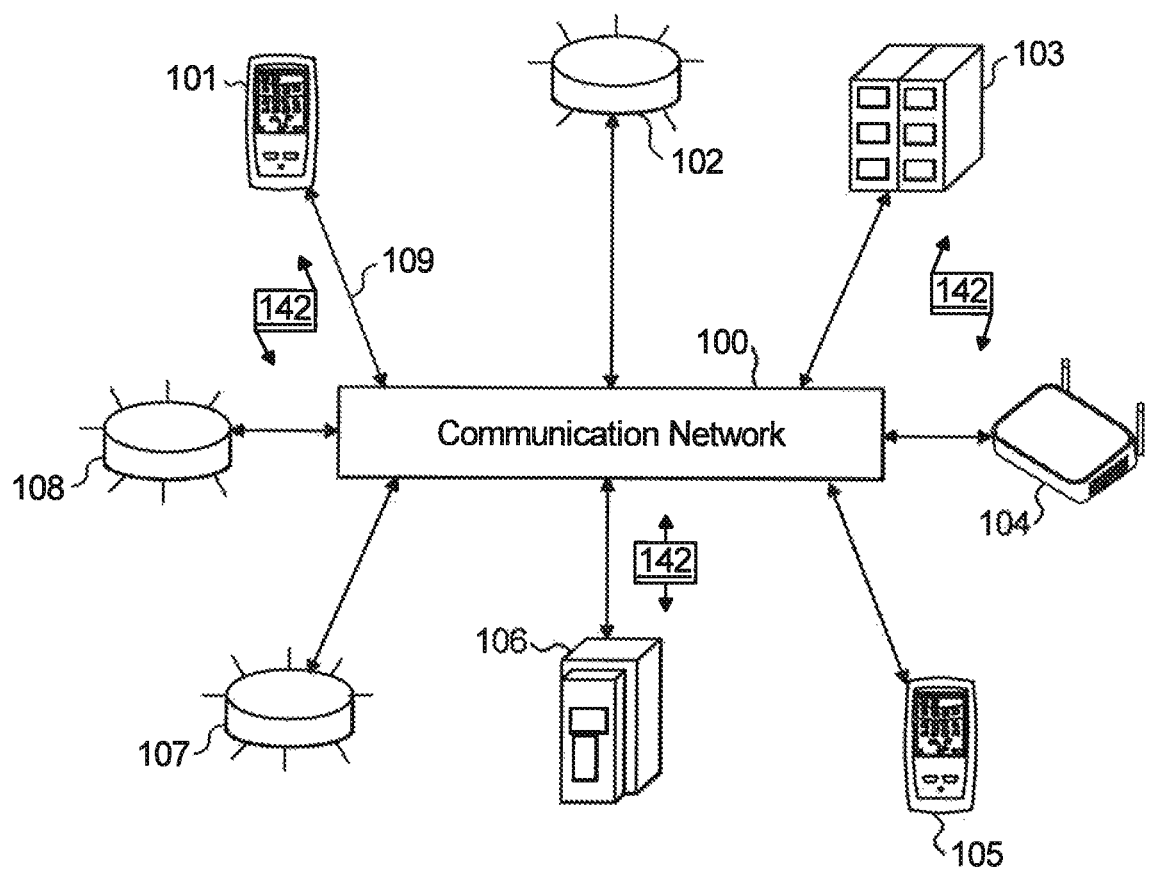
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, workstations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
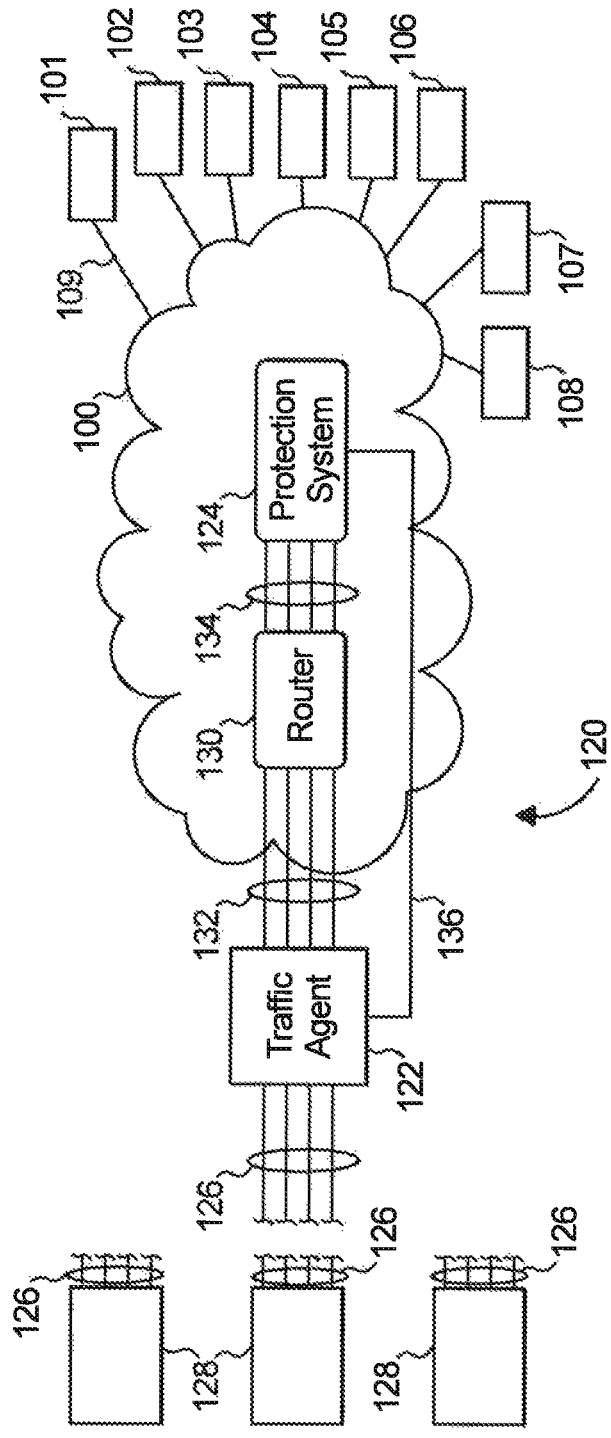
FIG. 4 illustrates an exemplary bad-traffic mitigation system.

With reference to FIG. 4, a bad-traffic mitigation system 120 is provided that mitigates entry of bad traffic into the network 100. The bad-traffic mitigation system 120 includes a traffic agent 122 and a network protection system 124 that can manage the traffic agent 122. The protection system 124 can include, for example, a threat management system (TMS) or availability protection system (APS), such as the PRAVAIL® or PEAKFLOW® systems provided by ARBOR NETWORKS®. The traffic agent 122 receives data entering the network 100 from source devices 128 via communication links 126. The source devices 128 may be transmitting and receiving packets to and from nodes/devices 101-108 via network 100. The communication links 126 can be optical or wired links that carry optical or electrical signals.

The protection system 124 receives network traffic exiting the traffic agent 122 for inspection, analysis, and possible mitigation, e.g., via communication links 132 and 134. A router 130 can be deployed between the traffic agent 122 and the protection system 124 such that the router 130 receives network traffic that exits the traffic agent 122 via communication links 132, and the protection system 124 receives network traffic exiting the router 130 via communication links 134. Communication links 132 and 134 can be optical or wired links that carry optical or electrical signals.

The traffic agent 122 can be positioned at an edge of the network 100 where it can be the entry point to the network 100. Accordingly, the traffic agent 122 can be the first device of the network 100 to encounter the network traffic. The traffic agent 122 can be upstream from the router 130 so that it encounters network traffic before the router 130 and before the protection system 124. Additionally, the traffic agent 122 can be a standalone device. For example, the traffic agent 122 can be physically distinct from the router 130 and the protection system 124, such as being encased in a different housing than a housing of router 130 and protection system 124, and/or communicating with the router 130 and protection system 124 by external communication links 132 and/or 134.

The protection system 124 can manage the traffic agent 122 by sending management messages via communication link 136 to update a blacklist of addresses stored by the traffic agent 122. In addition, the traffic agent 122 can transmit statistics about dropped network traffic and throughput via link 136 to the protection system 124.

Figure 2:
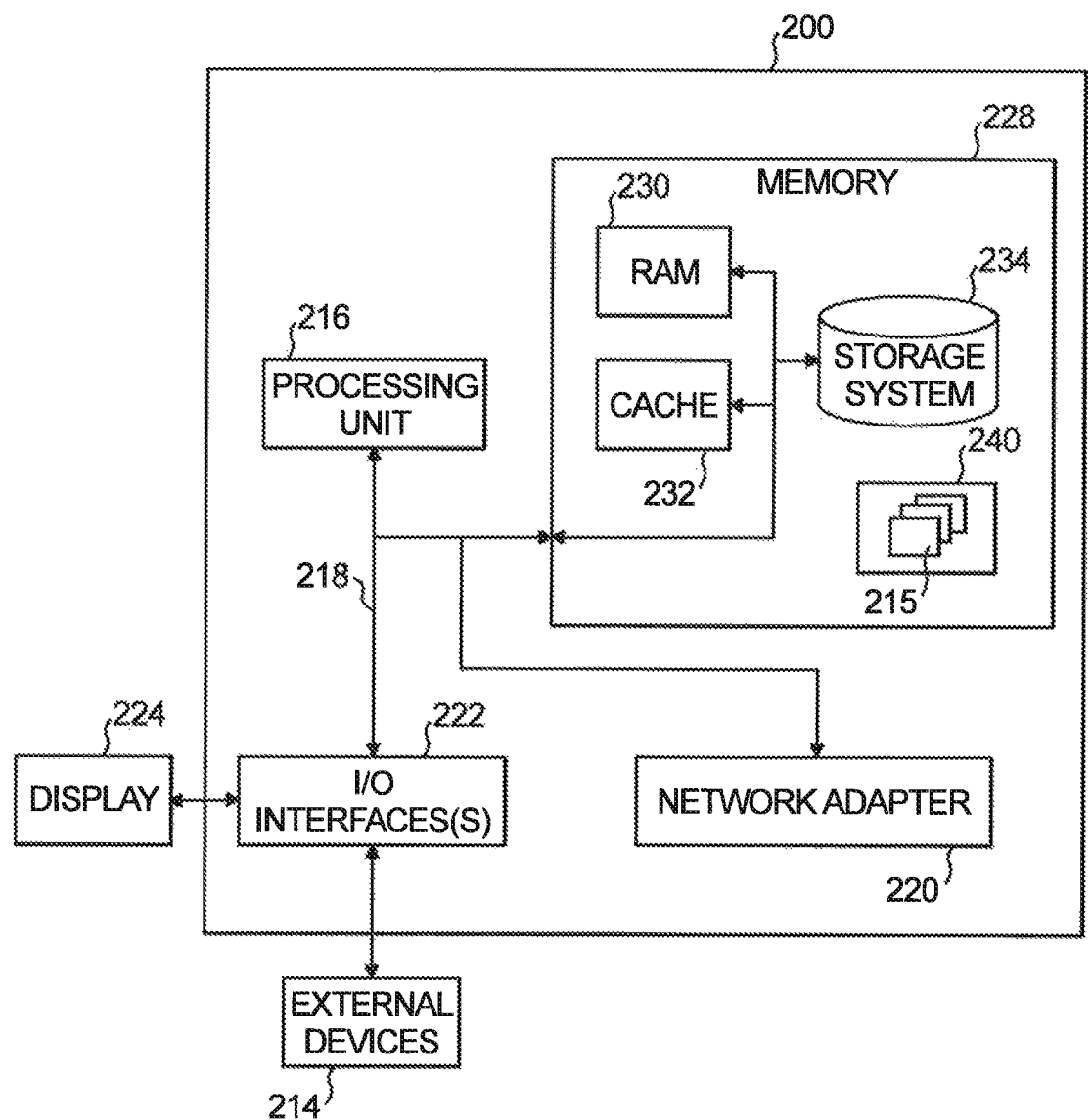
FIG. 2 illustrates an example network device/node.

FIG. 2 is a schematic block diagram of an example network computing device 200 (e.g., client computing device 103, server 106, traffic agent 122, router 130, network protection system 124, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
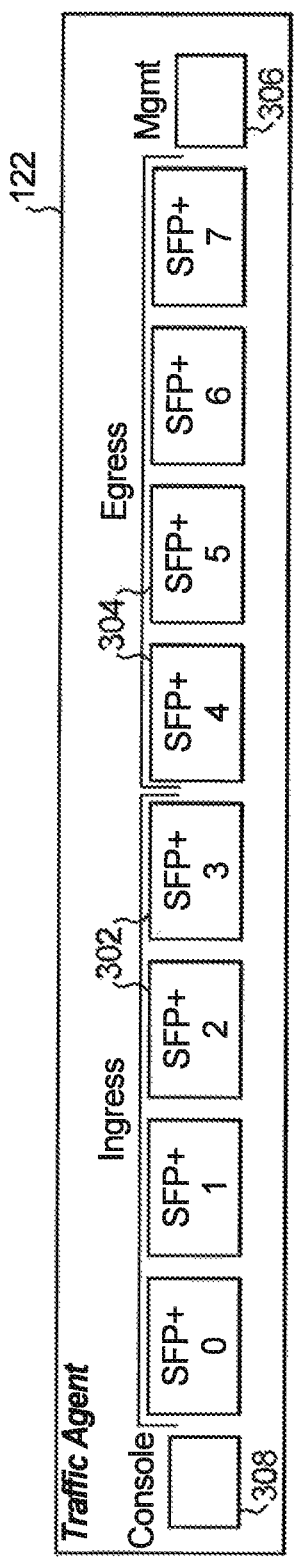
FIG. 3 illustrates a front view of an exemplary traffic agent.

With the exemplary communication network 100 (FIG. 1) and computing device 200 (FIG. 2) being generally shown and discussed above, description of certain illustrated embodiments of the present invention will now be provided. With reference now to FIG. 3, an exemplary embodiment of a front view of the traffic agent 122 is shown. The traffic agent 122 includes a plurality of ingress ports 302 and egress ports 304 that interface with communication links 126 and 132, respectively. For example, and without limitation, the ingress port 302 and egress ports 304 can each include a plurality of (e.g., four) parallel ports, such as modular small form-factor pluggable ports.

A management port 306 can couple to the protection system 124, and a console port 308 can couple to a user interface device (not shown). The user interface device can be, for example, a console or mobile device that includes at least one of a user input device (keyboard, touch screen, etc.) and a display device (e.g., a screen displaying a graphical user interface, indicator lights (LEDs)). The console port 308 couples to the user interface via a wired communication link (not shown). The console port 308 can be, for example but without limitation, a serial port. The user interface device can be operated by a user to configure the traffic agent 122, such as at setup, or to respond to emergency situations. Management port 306 couples to communication link 136 for direct communication between the traffic agent 124 and the protection system 124. This direct communication can include updating the blacklist by the protection system 124 or providing statistics by the traffic agent 122. Communication between the protection system 124 and the traffic agent 122 is described in greater detail below.

Installation of the traffic agent 122 can include insertion of interfaces of links 126, 132, and 136 in modular ports 302, 304, and 306. As shown, network traffic communicated between the traffic agent 122 and the protection system 124 can pass through the router 130. Alternatively, the traffic agent 122 can be connected directly to protection system 124, which can then pass traffic through to router 130. The traffic agent 122 and the protection system 124 can communicate directly via communication link 136.

Figure 5:
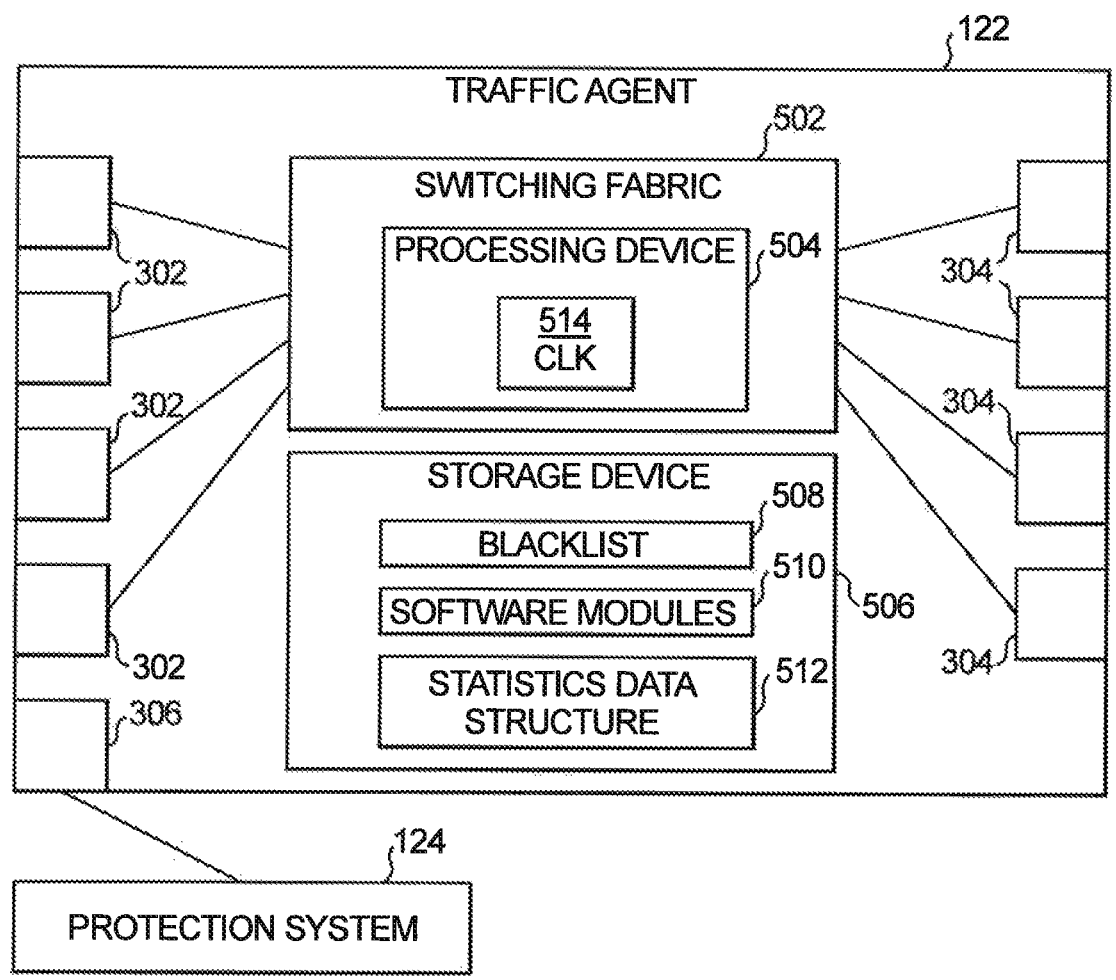
FIG. 5 illustrates an exemplary diagram of a traffic agent.

FIG. 5 shows a block diagram of an exemplary embodiment of the traffic agent 122. The traffic agent 122 receives packets that enter via the ingress ports 302. All information accessed is from the network layer of the packets or layers below the network layer. The network layer and layers below refers to the lowest three layers of the seven layers modeled by the Open Systems Interconnect (OSI) model of network communication, or the equivalent with respect to other models.

The traffic agent 122 includes a physical layer processing device that is disposed between the ingress ports 302 and the egress ports 304, and a processing device 504 associated with the physical layer processing device. In the example shown in FIG. 5, the physical layer processing device is a switching fabric 502. The switching fabric 502 operates in what can be described as a "conditional store-and-forward mode", wherein a packet received on one of the ingress ports 302 is held briefly while the packet headers are analyzed and then transmitted without modification to one of the egress ports 304 or discarded. Unlike a traditional switch or router, there is no "MAC learning" and packets that are forwarded are forwarded as-is. MAC learning refers to comparing an address obtained from the packet to a MAC table, and updating the MAC table based on the outcome of the comparison. The switching fabric 502 does not update a MAC table or the blacklist 508 based on a comparison to an address obtained from a packet. Rather, entries in the blacklist 508 expire based on the associated expiration time.

The traffic agent 122 is a two-way device. Egress traffic from devices 101-108 inside the network received on the egress ports 304 is forwarded unconditionally by the traffic agent 122 to the configured ingress ports 302 for exiting the network 100 as outbound traffic to a destination device (not shown). Packet inspection and blacklist matching is not performed on outbound traffic. Separate statistics on packets included in outbound traffic can be kept by the traffic agent 122.

In addition, the processing device 504 communicates with a storage device 506 that stores a dynamic black list data structure (referred to as a black list) 508 and at least one software modules 510. The processing device 504 can be configured similar to processing units 216, and the storage device 506 can be configured similar to system memory 228. Communication between the processing device 504 and the storage device 506 can be via a bus (not shown) similar to bus 218.

The switching fabric 502 receives packets via the ingress ports 302 and outputs the packets to the egress ports 304 subject to comparison of an address included in the packet to addresses stored in the blacklist 508. The comparison is made using the network layer of the packets. Packets that include a source address that is listed in the blacklist 508 are blocked by the switching fabric 502 and dropped. When dropped, the packet is not transmitted to the egress ports 304. The packet can be temporarily held (e.g., for a few milliseconds or a fraction of a millisecond) in the switching fabric 502 until it is determined whether the address is included in the blacklist 508.

The processing device 504 can count the number of and accumulate the size of packets that are received on the ingress ports 302. A separate count of and accumulated size of packets that are passed through to the egress ports 304 or dropped (i.e., not passed through to the egress ports 304) can also be maintained. These counts can indicate rates at which data is dropped or passed through based on number of packets or amount of data. A separate count of and accumulated size of packets that are received on egress ports 304 and unconditionally forwarded to the ingress ports 302 can also be maintained. Packets can be counted based on whether they are IPv4 or IPv6 and/or as a total of both kinds of packets.

In addition, the storage device 506 stores a dynamic statistics data structure 512 that counts the number of packets and/or the accumulated size of packets that are received, passed, dropped, or transmitted between the ingress ports 302 and the egress ports 304 based on IP protocol.

The processing device 504 can be, for example, without limitation, a microprocessor or firmware that executes programmable instructions software module 510 stored by the storage device 506 to perform methods of the disclosure. The processing device 504 can include a clock 514 that uses software and/or hardware to measure the amount of time that blacklisted addresses are stored. The processing device 504 can remove a blacklisted address that has expired due to the amount of time it is stored as a blacklisted address in blacklist 508 has exceeded an expiration time.

Figure 6:
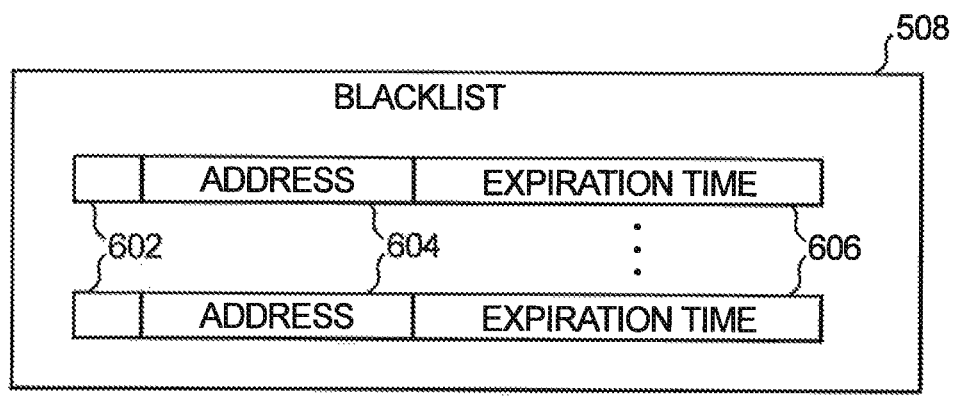
FIG. 6 illustrates an exemplary embodiment of a blacklist.

FIG. 6 shows a schematic diagram of an exemplary embodiment of the blacklist 508. The blacklist 508 can include a plurality of entries 602 that each include a blacklist address field 604 that stores a blacklisted address received from the protection system 124 based on an analysis performed by the protection system 124 that determines addresses associated with packets identified to have a threatening aspect. Instead of a blacklisted address, the blacklist address field 604 can store a subnet that includes a consecutive grouping of addresses, and thus blacklists any address included in the subnet.

Each entry 602 further includes an expiration time field 606. The expiration time 606 stores a value corresponding to the expiration time that can be specified by the protection system 124 or calculated from a default value. For example, the protection system 124 may increase the expiration time associated with an address in accordance with a factor, such as the gravity of the offence or a number of occurrences of offences detected in association with the address.

While an address is included in an entry 602 of the blacklist 508, all traffic from the address is dropped. When the amount of time (as clocked by CLK 514) that entry 602 has been included in the blacklist 508 has exceeded the expiration time 606 associated with the entry 602 has been exceeded (meaning the entry 602 has expired), the entry 602 is automatically removed from the blacklist 508. A determination of whether to remove entries 602 from the blacklist 508 can be performed at regular intervals, such as once per second. In this fashion, the blacklist 508 is "self-cleaning," which provides an advantage of "failing safe." Failing safe can refer to a situation in which the protection system 124 becomes disconnected from management devices or systems of the network 100 or otherwise inoperable. In this situation, all of the entries 602 in the blacklist 508 will eventually expire and be automatically removed from the blacklist 508, preventing unintentional blockage (e.g., dropping) of network traffic.

In many situations, the network traffic from a particular address or group of addresses is not likely to always be threatening. Thus, an expiration time can be initially set to a short period of time, such as two minutes. While network traffic from that address or subnet is blocked by the traffic agent 122 and dropped, the protection system 124 has no way of evaluating that network traffic because the traffic agent 122 does not forward traffic from blacklisted addresses to its egress ports 304. When the expiration time associated with an address or subnet is reached, the traffic agent 122 once again begins to forward the network traffic from the previously blacklisted addresses to its egress ports 304, and the protection system 124 receives this network traffic and again analyzes it to determine if the traffic is threatening. If the protection system 124 determines the previously blacklisted address is a "repeat offender" that is once again sending threatening network traffic, the protection system 124 can increase the expiration associated with that address and send a request to the traffic agent 122 to blacklist the address or subnet again.

Figure 7:
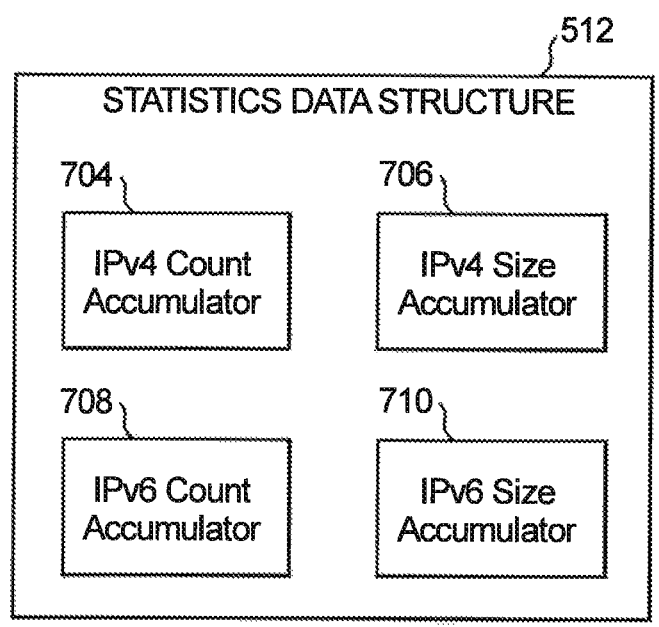
FIG. 7 illustrates a schematic diagram of an exemplary statistics data structure.

FIG. 7 shows a schematic diagram of an exemplary embodiment of the statistics data structure 512 that stores statistics calculated by the processing device 504. Each ingress port 302 and egress port 304 can have their own associated statistics data structure 512. The statistics data structure 512 can include counter fields storing respective counters that are incremented each time a packet is received and/or transmitted. During an analysis period, the counters can be used to determine how many packets have been dropped or passed through. In the example shown, the statistics data structure 512 includes an IPv4 count accumulator 704 and an IPv6 count accumulator that accumulate values from these counters, with separate counters or accumulators kept for packets using IPv4 and IPv6 protocols, respectively.

Additionally, the statistics data structure 512 can include size accumulators that are incremented in accordance with the size of packets that are received or transmitted or that are dropped and/or passed through during the analysis period. In the example shown, the statistics data structure 512 includes an IPv4 size accumulator 706 and an IPv6 size accumulator 710, with separate counters or accumulators kept for packets using IPv4 and IPv6 protocols, respectively.

In addition, the statistics data structure 512 can store dynamic statistics calculated and updated at predetermined time intervals (e.g., 30 seconds, one minute, or five minutes). For example, the processing device 504 can calculate a dynamic average of dropped packets per second and passed packets per second, determined over a one minute interval, stored in the statistics data structure 512, and updated each interval. Statistics for packets using IPv4 and IPv6 protocols can be determined independently or in combination.

Figure 8:
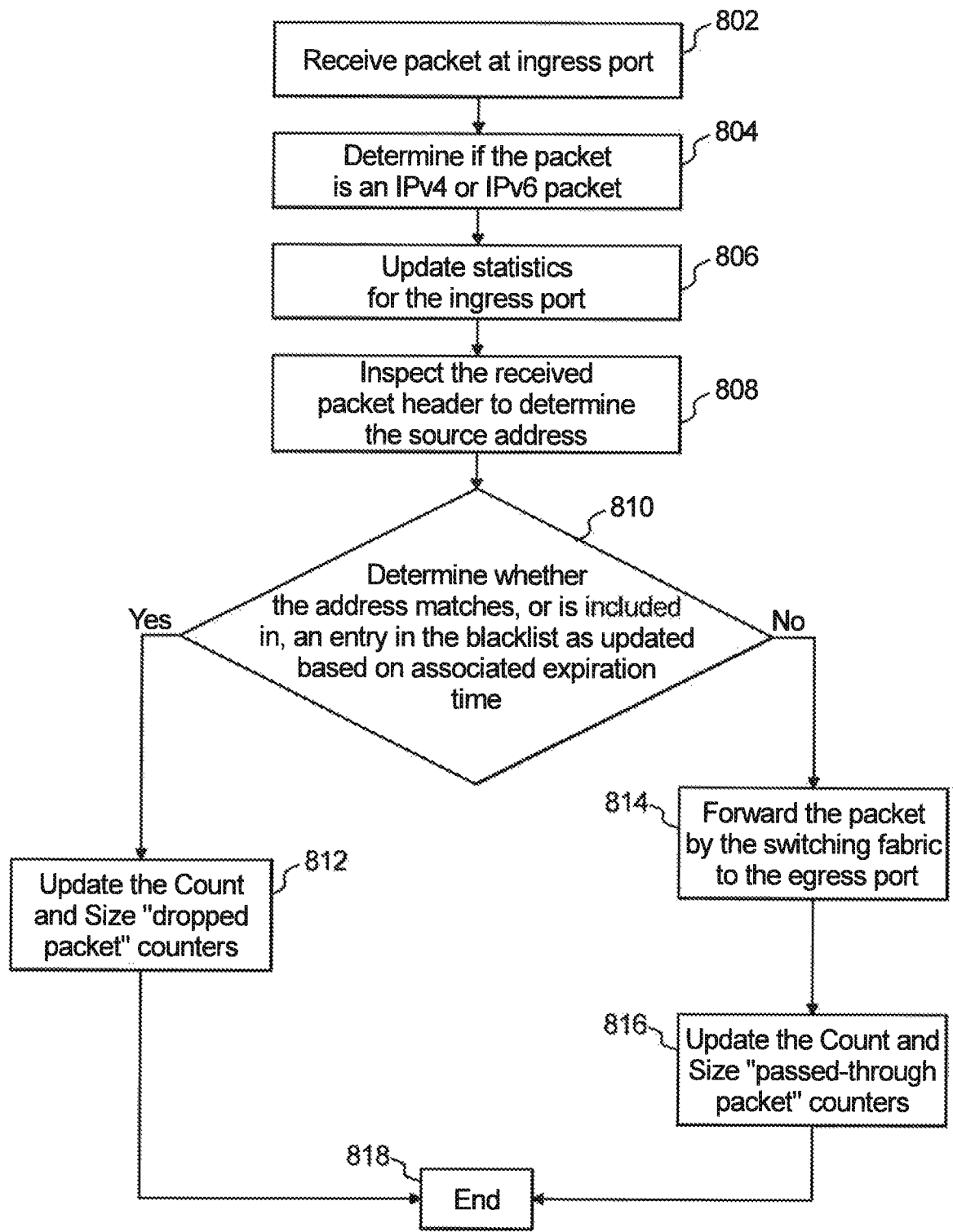
FIGS. 8 and 9 are flowcharts demonstrating implementation of exemplary embodiments illustrated herein.
Figure 9:
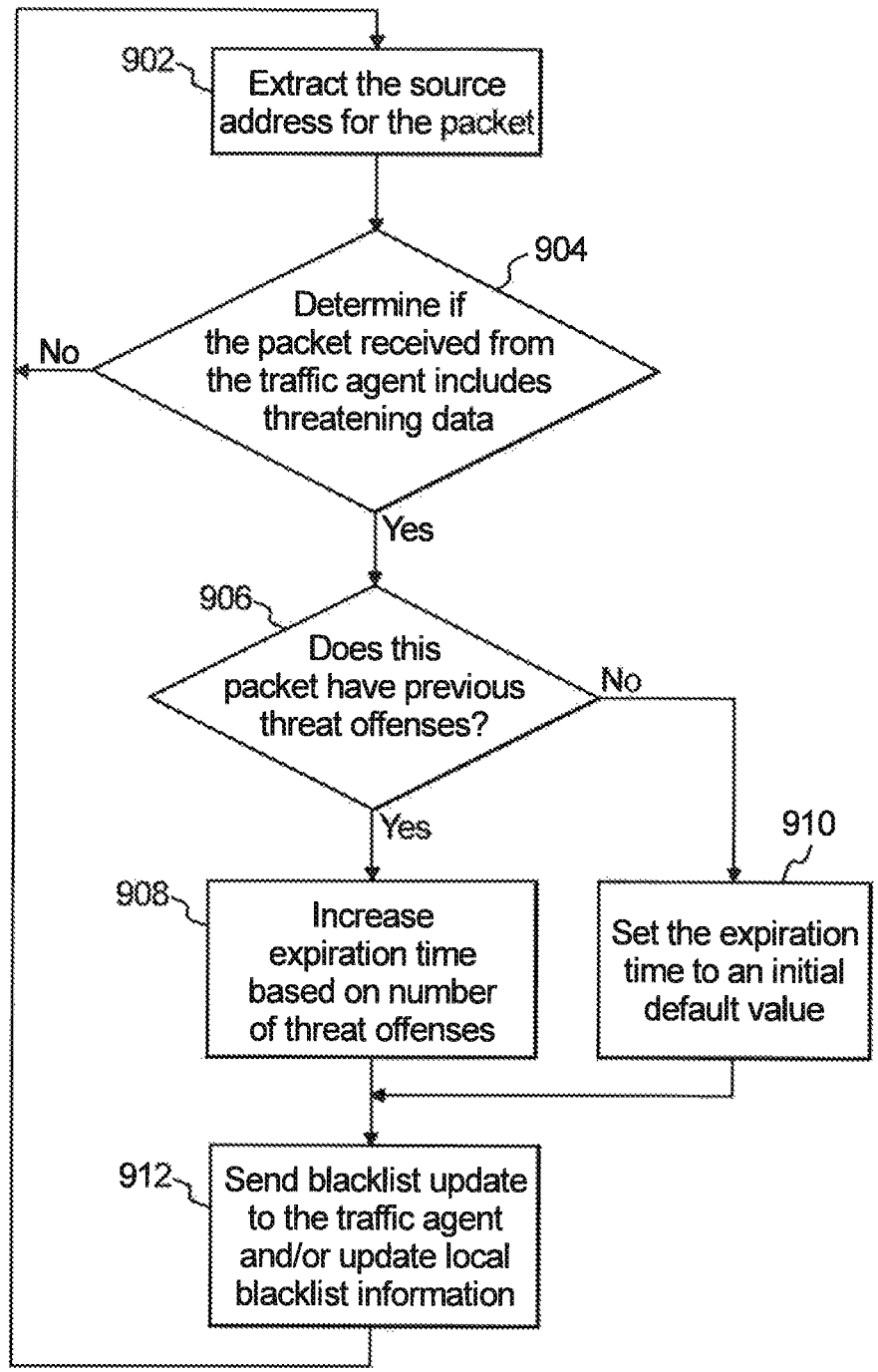

With reference now to FIGS. 8 and 9, shown are flowcharts demonstrating implementation of the various exemplary embodiments. It is noted that the order of steps shown in FIGS. 8 and 9 is not required, so in principle, the various steps may be performed out of the illustrated order. Also certain steps may be skipped, different steps may be added or substituted, or selected steps or groups of steps may be performed in a separate application following the embodiments described herein.

FIG. 8 shows a flowchart of operations of an example method of the network agent 122 for processing a packet received by the network agent 122. At operation 802, a packet is received at the ingress ports 302. At operation 804, a determination is made using the network layer of the packet whether the packet is an IPv4 or IPv6 packet. At operation 806, statistics are updated for the ingress ports 302 to determine a number and/or size of packets that received at the ingress ports 302. Independent counts can optionally be maintained for IPv4 packets and IPv6 packets.

At operation 808, the header of the received packet is inspected to determine the source address. At operation 810, a determination is made whether the source address matches or is included in an entry in the updated blacklist. The updated blacklist includes unexpired blacklisted addresses. Any addresses that have expired have been removed from the blacklist. Addresses expire based on an expiration time associated with the address included in the blacklist. If the blacklist includes a subnet of addresses, the determination at operation 810 includes determining whether the source address is part of a subnet of addresses on the blacklist.

If the determination at operation 810 is YES, then at operation 812, counters are updated that track the number and size of packets that are dropped, after which the method ends at operation 818 without forwarding the packet further. At operation 812, independent counts can optionally be maintained for IPv4 packets and IPv6 packets.

If the determination at operation 810 is NO, then at operation 814, the packet is forwarded by the switching fabric 508 to the egress ports 304. At operation 816, the counters are updated that track the number and size of packets that are passed through to the egress ports 304. At operation 816, independent counts can optionally be maintained for IPv4 packets and IPv6 packets. The method ends at operation 818.

Other operations performed by the traffic agent 122 can include sending counter data stored by the data structures 512 to the protection system 124. This counter data can be sent periodically, or in response to an event, such as in response to a query from the protection system 124 or the counter data reaching a threshold value. The counters can optionally be reinitialized to "0" by request of the protection system 124. Additionally, the traffic agent 122 can determine and report average data rates for passed or dropped traffic for one or more time intervals. The average data rates can be based on a dynamic average, such that values are updated at regular intervals.

With reference to FIG. 9, operations of an example method performed by the protection system 124 are shown. At operation 902, the source address of the packet is extracted from the network layer. At operation 904, a determination is made whether a packet received from the traffic agent includes threatening data. If the determination at operation 904 is YES, then at operation 906, a determination is made whether this source address has been determined previously to be associated with a detected threat. If the determination at operation 906 is YES, then at operation 908, the expiration time associated with the packet is increased. The increase can be based on the number of previous threat offenses associated with the source address. Each increase can be performed in increments, such as minutes. The expiration time can increase linearly or non-linearly (such as in accordance with a mathematical formula, e.g., exponentially) as the number of previous threat offenses increases. If the determination at operation 906 is NO, then at operation 908, the expiration time is set to an initial default expiration time.

At operation 912, a blacklist update is sent to the traffic agent 122 with the source address and the associated expiration time. This update can use a predetermined protocol that is secure from tampering. If a local blacklist is maintained, it is updated as well. The method continues at operation 902 after the next packet is received. If the determination at operation 904 is NO, the method continues at operation 902 when the next packet is received.

The protection system 124 can further perform operations such as request or automatically receive statistics, such as counter values, data rates, or average data rates, from the network agent 122.

Conventional approaches to mitigation of "bad" network traffic that use software which is integrated with routers and/or managed switches and/or use software defined networking (SDN) can present compatibility issues that result in complex configuration and management steps, increased cost, and extensive compatibility testing. For example, integrated mitigation software may require upgrades each time the host device is modified. Additionally, significant testing of required functionality of the host device may be needed in response to each change or upgrade to the mitigation software. The mitigation software can result in reduced performance and/or bandwidth, especially as the number of dropped packets increases. Such mitigation software may not provide accurate statistics, such as size and number of packets for dropped and passed network traffic, throughput rates, etc. Management of adding, updating and removing blacklisted addresses or blocks of addresses may be slow and/or require manual management. Additionally, the host device may be distant from the network edge such that upstream network devices may need to process and forward "bad" traffic.

Advantageously, the traffic agent 122 can provide a comparatively simple and cost-effective method of mitigating "bad" network traffic, providing line-rate forwarding of all traffic that is allowed to pass from the ingress ports 302 to the egress ports 304, using dedicated hardware to process the network traffic. By default (such as on power-up or reboot), the traffic agent 122 can be transparent without influencing network traffic. Features provided by the traffic agent 122 include generation of statistics for size and packet counts for dropped and/or passed network traffic, throughput rates, which can be provided at regular intervals or in response to a query, including independent reporting for IPv4 and IPv6 addresses. The blacklist can be automatically updated using a predetermined secure protocol without manual intervention. Blacklist entries can be automatically removed as they reach an expiration time. The traffic agent 122 automatically returns to a "failsafe" configuration of transparently passing all network traffic once all blacklisted addresses expire. Configuration and installation of the traffic agent 122 are relatively simple, with modular interfaces that can operate at a variety of network rates (e.g., 10, 40 and 100 Gbps). Existing network devices would not need reconfiguration when the traffic agent 122 is installed.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A network management system for providing intrusion detection using an adjustable blacklist, comprising:
   a protection device coupled in a network downstream of a router operative to detect network instruction so as to configure a blacklist;
   a traffic agent device coupled intermediate a plurality of network traffic sources and upstream of the network router in the network, including:
      a switching fabric for retaining packets received from a network data source for a predetermined time period to facilitate analysis of the received packet;
      a plurality of hardware ingress ports in data communication with a source of network traffic for receiving network traffic entering the network;
      a plurality of hardware egress ports in data communication with a respective one of the plurality of ingress ports and the router;
      a storage device including an adjustable blacklist;
   a plurality of statistics data structures wherein each of the plurality of egress and ingress ports is associated with a dedicated statistics data structure that counts the number of IPv4 and IPv6 packets and accumulated size of IPv6 packets that are received, passed, dropped and transmitted between each of the plurality of hardware ingress ports and each of the plurality of hardware egress ports such that each of the plurality of statistics data structures independently updates the adjustable blacklist based upon network traffic flow between a respective ingress port and egress port respectively coupled to a respective statistics data structure;
   a processor configured to receive least one blacklist address from the protection device determined to be a threat to the network to maintain the adjustable blacklist that includes at least one blacklist address, the processor configured to:

compare the network layer source address of a packet of the network traffic received by the at least one ingress port and held in the switching fabric to the adjustable blacklist of the storage device;

forward the packet to the at least one egress port only if the packet's source address is not included in the adjustable blacklist; and transmit data accumulated in each of the plurality of statistics data structures from the traffic agent device to the protection device.

2. The system as recited in claim 1, wherein blacklist addresses of the blacklist are associated with respective expiration times that define an amount of time until the associated blacklist address expires and is no longer included in the blacklist.

3. The system as recited in claim 2, wherein the protection device is configured to determine if the source address has been previously blacklisted, and if so, increase the expiration time associated with the source address having been previously blacklisted.

4. The system as recited in claim 2, wherein the protection device is configured to:

receive the network traffic from the at least one egress port;

decode the network traffic received from the at least one egress port using a layer higher than the physical layer;

analyze the received network traffic for detecting a threat to the network;

extract a network layer source address from a packet of the network traffic that was determined to pose a threat to the network;

transmit the source address extracted to the network traffic agent for inclusion in the blacklist; and send the received network traffic to its intended destination as indicated by decoded content of the network traffic.

5. The system as recited in claim 1, wherein the traffic agent device performs only network layer inspection on the network traffic.

6. The system as recited in claim 1, wherein the traffic agent device is the first device of the network to receive the network traffic.

7. The system as recited in claim 1, wherein the traffic agent device is a standalone device.

8. The system as recited in claim 1, wherein the network traffic is forwarded from the at least one ingress port to the at least one egress port is transmitted at line-rate, and network traffic received by the at least one egress port is always unconditionally transmitted to the ingress port.

9. The system as recited in claim 1, wherein the processor is further configured to count at least one of number and size of packets that are passed through from the at least one ingress port to the at least one egress port and that are not passed through.

10. The system as recited in claim 1, wherein the processing device independently counts IPv4 and IPv6 packets.

\* \* \* \* \*